(12) United States Patent
Gailloux et al.

(10) Patent No.: US 8,136,114 B1
(45) Date of Patent: Mar. 13, 2012

(54) BUSINESS PROCESS MANAGEMENT SYSTEM HAVING DYNAMIC TASK ASSIGNMENT

(75) Inventors: Michael A. Gailloux, Overland Park, KS (US); Devon L. Biere, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1357 days.

(21) Appl. No.: 11/408,475

(22) Filed: Apr. 21, 2006

(51) Int. Cl.
 *G06F 9/46* (2006.01)
 *G06Q 10/00* (2006.01)

(52) U.S. Cl. .................. 718/104; 718/102; 705/7.12

(58) Field of Classification Search .................. None
 See application file for complete search history.

(56) References Cited

U.S. PATENT DOCUMENTS

| | | | | |
|---|---|---|---|---|
| 6,785,889 | B1 * | 8/2004 | Williams | 718/104 |
| 6,850,895 | B2 * | 2/2005 | Brodersen et al. | 705/9 |
| 6,889,243 | B1 * | 5/2005 | Hondou et al. | 718/100 |
| 7,107,591 | B1 * | 9/2006 | Karp et al. | 718/104 |
| 7,137,119 | B1 * | 11/2006 | Sankaranarayan et al. | 718/103 |
| 7,207,043 | B2 * | 4/2007 | Blythe et al. | 718/104 |
| 7,212,987 | B2 * | 5/2007 | Swanke et al. | 705/9 |
| 7,269,652 | B2 * | 9/2007 | Chen et al. | 709/226 |
| 7,386,850 | B2 * | 6/2008 | Mullen | 718/104 |
| 7,426,729 | B2 * | 9/2008 | Avvari et al. | 718/104 |
| 7,502,747 | B1 * | 3/2009 | Pardo et al. | 705/8 |
| 7,634,776 | B2 * | 12/2009 | Parameswaran et al. | 718/105 |
| 7,681,196 | B2 * | 3/2010 | Vedula | 718/104 |
| 7,703,101 | B2 * | 4/2010 | Cuomo et al. | 718/104 |
| 7,743,378 | B1 * | 6/2010 | Markov | 718/102 |
| 2004/0119752 | A1 * | 6/2004 | Beringer et al. | 345/779 |
| 2004/0205206 | A1 * | 10/2004 | Naik et al. | 709/230 |
| 2005/0004825 | A1 * | 1/2005 | Ehrler et al. | 705/8 |
| 2005/0015504 | A1 * | 1/2005 | Dorne et al. | 709/229 |
| 2005/0288948 | A1 * | 12/2005 | Devulapalli et al. | 705/1 |
| 2006/0229896 | A1 * | 10/2006 | Rosen et al. | 705/1 |
| 2007/0061446 | A1 * | 3/2007 | Matsuo et al. | 709/224 |
| 2007/0136731 | A1 * | 6/2007 | Bennington et al. | 718/103 |
| 2007/0143764 | A1 * | 6/2007 | Kern et al. | 718/104 |
| 2007/0143765 | A1 * | 6/2007 | Aridor et al. | 718/104 |
| 2007/0299674 | A1 * | 12/2007 | Timko et al. | 705/1 |

OTHER PUBLICATIONS

Vignette V7, "Vignette® Process Workflow Modeler," Vignette Corporation, May 2003, pp. 1-4.
Products: Clarity: Process Manager, "Automate Business Processes to Save Time and Money," http://www.niku.com/ww/products.asp?id=56, Nov. 10, 2005, 2 pgs.
ILOG Visualization Suite, "BPM/Workflow," http://ilog.com/products/visualization/bpm.cfm, Nov. 10, 2005, pp. 1-3.

\* cited by examiner

*Primary Examiner* — Meng An
*Assistant Examiner* — Tammy Lee

(57) ABSTRACT

Disclosed herein is a system and method for the dynamic assignment of tasks within an enterprise through determining a group of one or more candidate resources based on defined attributes of a task. The group of one or more candidate resources is then analyzed to intelligently assign the task to one of the resources based on one or more of presence, location, schedule, workload, and performance history for each candidate resource.

18 Claims, 3 Drawing Sheets

BUSINESS PROCESS MANAGEMENT SYSTEM HAVING DYNAMIC TASK ASSIGNMENT

CROSS-REFERENCE TO RELATED APPLICATIONS

None.

STATEMENT REGARDING FEDERALLY SPONSORED RESEARCH OR DEVELOPMENT

None.

REFERENCE TO A MICROFICHE APPENDIX

Not applicable.

BACKGROUND

Business process management (BPM) systems enable an enterprise to generate formalized workflows for all of the operations within the enterprise. One of the common steps in such workflows is to assign a task to a person ("resource") in the enterprise. Existing BPM systems perform such task assignments in a very rudimentary manner. For example, when a BPM system is assigning a task to a resource such as a technician, the BPM system may have a group of resources (technicians) to select from. Often the BPM simply adds the task to a list for those resources to choose from. This may be disadvantageous since the technicians will often select easier tasks first and attempt to avoid the more difficult tasks. As a result, higher priority tasks may not be performed in a timely manner if the resources recognize that it will be a harder task to complete.

Alternatively, the BPM system assigns tasks to each resource in the group in a round-robin fashion. That is, the BPM system maintains a list of qualified resources and assigns tasks one at a time starting at the top of the list and continuing to the bottom of the list. Once the bottom of the list is reached the assignment of tasks starts at the top again. This may be disadvantageous since high priority tasks may be assigned to slower resources. Also, some resources may be qualified for many different types of tasks. For example, resource A is able to perform tasks X and Y. Resource B is only able to perform task Y. Resource A may currently have a large workload of X tasks and still have Y tasks being added to their workload. Resource B may have a much smaller workload since resource B can only perform Y tasks. As such, existing BPM systems may create unbalanced workloads for the resources.

SUMMARY

Disclosed herein is a Business Process Management system and method having dynamic task assignment within an enterprise. In some embodiments, the method includes determining a group of one or more candidate resources based on defined attributes of a task. The group of one or more candidate resources is then analyzed to intelligently assign the task to one of the resources based on one or more of presence, location, schedule, workload, and performance history for each candidate resource. This method enables high priority tasks to be completed in a timely manner as well as maintaining a balanced workload between all of the resources.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
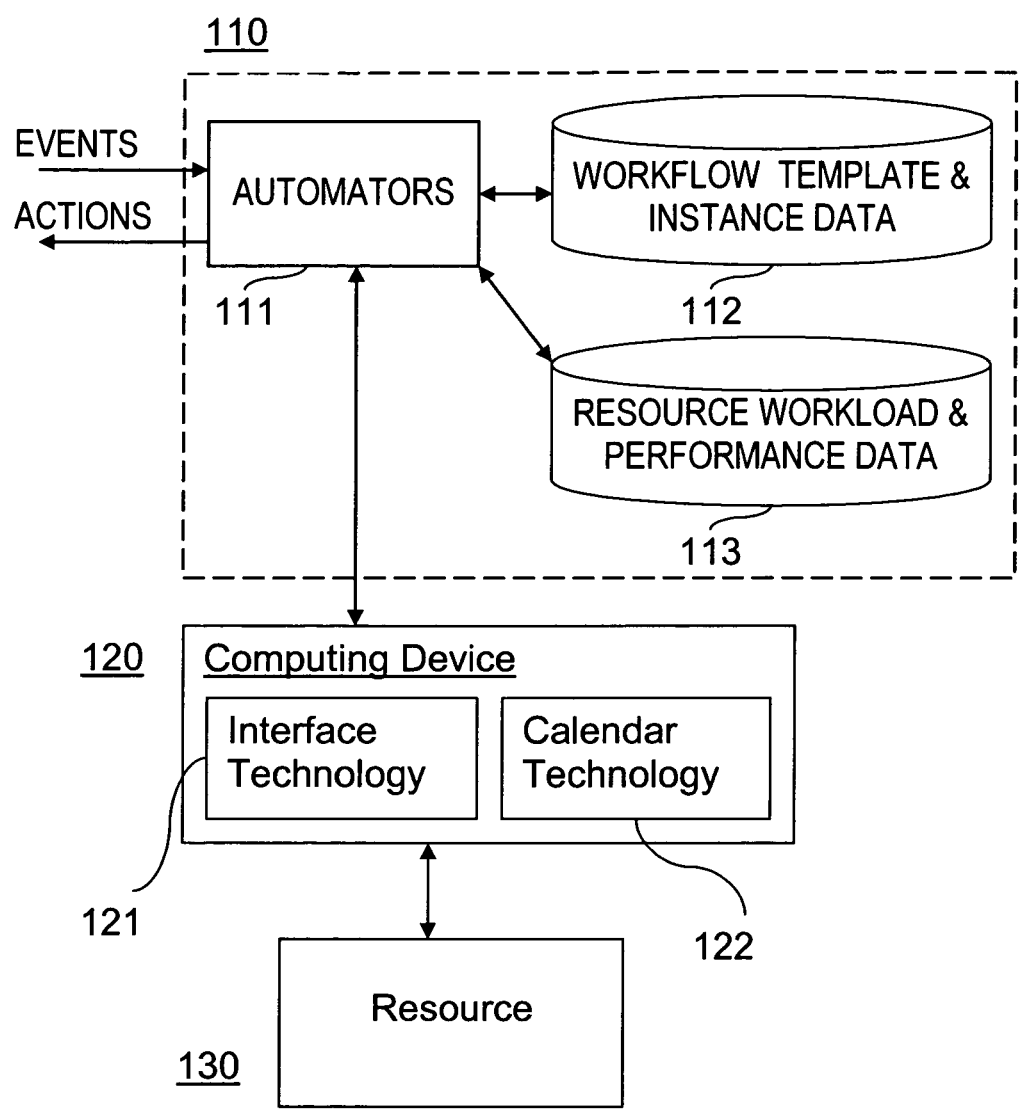
FIG. 1 is an illustrative example of a BPM system having dynamic task assignment to resources.

In existing Business Process Management (BPM) systems the assignment of tasks to resources has been performed unintelligently. The prior art BPM methods of assigning tasks to resources may rely on one attribute of the task, namely the type of task, to determine a group of one or more resources that are able to complete the task. This determination alone may not be sufficient to intelligently assign tasks to the most appropriate resource.

Herein are disclosed BPM system embodiments that provide dynamic assignment of resources in a manner that considers various anticipatory factors at the time of assignment rather than simply leaving workload imbalances, known absences, and other such issues to be addressed after a poor allocation strategy has created scheduling problems that need to be addressed in a reactive manner. This dynamic assignment may be accomplished through a thorough examination of not only a task itself, but also of the resources that are able to complete that task.

As such, not only the type of task may be determined but also the level of effort (LOE) estimated to complete the task, the service level agreement (SLA) for indicating when the task needs to be completed, and the location where the task needs to be completed. The LOE for a task may be determined by averaging the amount of time all of the resources in an enterprise take to complete a particular type of task. Further, the resources themselves may be examined to determine their presence, location, schedule, workload, performance history, or any other metric for determining which resource will be the most effective for completing a given task.

Business process management (BPM) software and systems are designed to automate business processes. Some broad examples of business processes include supply requisitioning, product manufacturing, order fulfillment, and service delivery, to name just a few. Such processes include multiple phases, or "states", that must be completed successfully and in an orderly fashion for the business to function efficiently. Transitions between states occur as various actions are taken to move the process along. For example, order fulfillment may involve receiving a customer order, checking inventory, updating inventory, processing payment, scheduling delivery, performing delivery, updating the customer information database, and sending warranty information. Some of these phases may be performed out of order, though some order restrictions may be necessarily present (e.g., the customer order must be received before the product is delivered). Each of these phases may themselves include multiple steps.

Vitria BusinessWare and other examples of BPM software and systems provide one way to specify and automate the various business processes of an enterprise. Through a graphical user interface, a user can specify business process states and can specify actions and events that cause a business process to progress through the states. The events may be occurrences recognized by the software, such as receipt of an order as entered by a customer representative, a response to a credit history inquiry, or an elapsed timer. The actions may be actions initiated by the software, such as updating a database, or scheduling a delivery and sending notifications to a warehouse and a delivery truck driver, or assigning a task to a warehouse employee to verify inventory.

FIG. 1 shows an illustrative BPM system 110 having dynamic task assignment. BPM system 110 includes an automator process 111, a workflow database 112, and a resource database 113. The automator process 111 receives events from various enterprise systems. The events can include the placing of a new order and indications of the completion of various steps involved in fulfilling the order. The automator process 111 may create a new instance of a workflow for each item passing through a business process (e.g., a supply requisition, a product to be manufactured, an order to be filled, or a service to be performed). Thus, for example, automator process 111 may create an order fulfillment workflow in response to the placing of a new order. Then, as the automator process detects appropriate events and initiates appropriate actions, the automator transitions the business process instance through the appropriate sequence of states. The templates for various workflows and the data associated with the various workflow instances are maintained in workflow database 112.

The workflows often specify various tasks to be assigned to people and various steps to be taken after those tasks are completed. Tasks may include a description of a problem to be resolved, a product to be manufactured, supplies to be ordered, etc. The BPM software 110 maintains a resource database 113 to track the identity and contact info for qualified resources, the workloads of those resources, and the past performance history of those resources (e.g., average time to complete each particular type of task). The automator process 111 couples to one or more computing devices 120 to assign tasks and receive notice of when those tasks are completed.

Computing device 120 may be a personal computer, laptop, personal digital assistant (PDA), cell phone, or another device or system suitable for assigning a task to a selected resource. While only one computing device 120 is illustrated, it is noted that each resource 130 within the enterprise may have a computing device 120. Within the computing device 120 is an interface technology 121 such as an instant messaging program, e-mail, web browser, custom network interface, voice message system, etc., to enable the resource to receive assigned tasks and to indicate when such tasks have been completed or when such tasks must be refused or otherwise terminated for any reason. The computing device 120 may also include calendaring technology 122, such as MICROSOFT OUTLOOK, that enables the resource 130 to indicate a work schedule with work hours and any planned vacation time. The resource may further indicate any sick leave or unplanned unavailability using the calendaring technology.

A resource's presence may be determined through interaction with the interface technology 121. For example, when using an instant messaging program, the BPM system may query the instant messaging program to determine a resource's presence by determining if a resource is logged in and their status indicates they are ready for work. Typical instant messaging programs such as AOL INSTANT MESSANGER, YAHOO! MESSENGER, or MSN MESSENGER allow for the status of the person using it to be communicated across a network by indicating to other users that the person is available, busy, idle, away, or any number of customizable status identifiers known to those skilled in the art. Alternatively, a resource's presence may simply be determined through a detection of whether or not the resource is logged in to the enterprise network.

A resource location may also be determined through interaction with the interface technology 121. This may be accomplished through the determination of which network the resource is connected to. For example, resource A may be connected to the enterprise through network X and resource B may be connected to the enterprise through network Y. The determination of which network the resource is connected to may then be used to determine what city, state, or other location information of the resource. Alternatively, when a resource is mobile and using a wireless device such as a cell phone or PDA then a location may be determined based on which cell tower they are connecting through, or a global positioning system (GPS) output from the wireless device, or any other means for determining the location of wireless devices known to those skilled in the art.

The assignment of tasks made by the BPM system 110 may be communicated to each resource 130 through the computing device 120 by means of the interface technology 121. For example, if an e-mail program is used then after each task is assigned to a resource 130 an e-mail will be sent indicating the task to be completed. Alternatively the highest priority task for a given resource 130 may be communicated via a text message through an instant messaging program. Upon the resource 130 completing the task, the resource may send a message back to the BPM system to indicate they are ready for their next task. A web browser may also be used to communicate the assignment of tasks by a resource 130 logging in to a web site through a graphical user interface (GUI) displayed on the web browser. The GUI may display a list of potential tasks for the day and indicate which task has the highest priority for the resource to currently work on. Similarly a custom network interface may be used to connect directly with the BPM system and display a GUI with a task list and current task to work on. A voice message system may also be used to communicate the assignment of tasks in a similar way as the instant messaging program. Namely, the BPM system 110 may send a voice message indicating the highest priority task for a given resource 130 to the computing device 120 of the resource 130. Upon the resource 130 completing the task, the resource 130 may send a message back to the BPM system indicating they are ready for the next task.

The schedule of a resource 130 may also be determined through interaction with the standard calendar technology 122, such as MICROSOFT OUTLOOK, on the computing device 120. The BPM system 110 may query the standard calendar technology 122 on the computing device 120 of each resource 130. The standard calendar technology 122 may be independently implemented on the same computing device 120 as the interface technology 121 or it can be embedded within the interface technology 121 itself. Each resource 130 may set a normal working schedule in the standard calendar technology 122. For example, a resource A may have a normal working schedule of 8:00 am thru 5:00 pm, Monday thru Friday with a lunch break between 11:00 am thru 12:00 pm. Further, any additional changes to a resource's schedule may be updated on the standard calendar technology 122. For example, if a resource is on vacation, out sick, comes in late, etc., these changes to the normal working schedule may be reflected in the standard calendar technology 122. The changes from the normal working schedule may be input to the standard calendar technology 122 manually by each resource 130 or they may be input to the standard calendar technology 122 automatically through the use of a clock-in/clock-out system.

A resource's performance history may be maintained and stored within resource database 113 in the BPM system 110. Each task may have an estimated LOE associated with it and as a resource 130 completes each task the resource's performance history for that type of task is updated based on how much time was required for the resource to complete the task and the estimated LOE for the task. This may be accomplished by determining what percentage of the estimated LOE a resource needed to complete a task. For example, if a task A has an estimated LOE of 2 hours and a resource B completes task A in 1 hour and 30 minutes then resource B completed task A in 75% of the estimated LOE. As such, the performance history of resource B for A-type tasks is 75% of the estimated LOE. If resource B is again assigned task A with the estimated LOE of 2 hours and completes the task in 1 hour and 45 minutes then resource B completed task A in 87.5% of the estimated LOE. As such resource B's performance history for A-type tasks is averaged to be 81.25% of the estimated LOE.

A resource's workload may also be maintained and stored within resource database 113 in the BPM system 110. The resource's workload may be calculated as described in detail below. As each new task is assigned to a resource, the workload is updated in database 113 in the BPM system 110.

Figure 2:
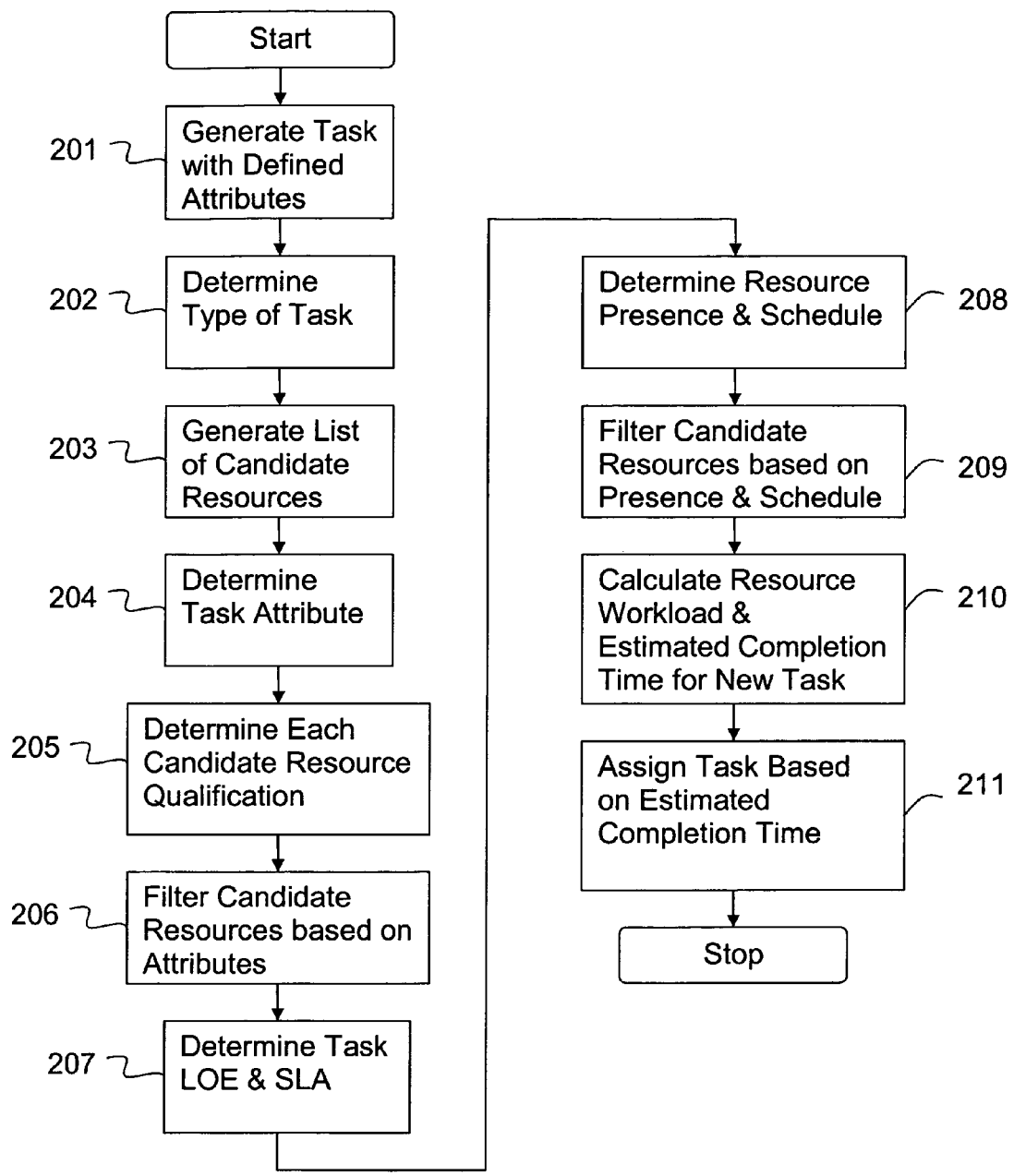
FIG. 2 is an illustrative example of a process for selecting the ideal resource for a particular task.

FIG. 2 is an illustrative dynamic task assignment process that optimally selects a resource for a particular task. The process of FIG. 2 starts at step 201 with the BPM system 110 generating a task with defined attributes. A task's attributes include at least the type of task, the information needed to perform the task, the estimated LOE for the task, and the SLA for the task. For example, if the task is to schedule a delivery then the task's attributes would include at least that it is a delivery task, the pick-up and drop-off locations, the estimated time for delivery, and when the delivery needs to be completed.

In step 202 the type of task is determined and a list of candidate resources which are qualified to complete the task is generated by the BPM system 110 in step 203. The database 113 in the BPM system 110 may store a database indicating what types of tasks each resource is qualified to complete. In the case of scheduling a delivery, only those resources that are delivery drivers are placed on the list of candidate resources.

In step 204 the relevant task attributes are identified, e.g., the location where the task needs to be completed is determined. In the case of scheduling a delivery this would be the pick-up and drop-off locations. It is noted that tasks may be location independent, and as such it may be determined that any location is suitable for completing the task. In step 205 the suitability (e.g., location) of each candidate resource is determined, and in step 206 the list of candidate resources is filtered based on the relevant task attribute such as the location of the task. As a result, only the candidate resources that are suited to the task will remain in the list of candidate resources. In the case of scheduling a delivery, only the delivery drivers that operate in the area of the pick-up and drop-off locations would remain on the list.

In step 207 the LOE and the SLA for the task are determined. In the case of scheduling a delivery, the LOE would be the estimated time for delivery and the SLA would be when the delivery needs to be completed. In step 208 the presence and schedule of each resource in the list is determined. In the case of scheduling a delivery, the schedule and presence of each of the delivery drivers may be determined through the calendar technology 121. The presence of a delivery driver may be determined based on whether or not a delivery driver is currently scheduled to be out on a delivery. The SLA is compared to each resource's schedule to determine which resources are potentially available to complete the task. Any resources that are not scheduled to work enough to potentially fulfill the requirements of the SLA based on the estimated LOE may be filtered from the list in step 209. For example, if the SLA for a task indicates that the task has to be completed in two days and the estimated LOE for the task is one and a half days then any resource that isn't scheduled to be in both of the next two days is filtered from the list.

The presence of the remaining candidate resources is checked to determine which resources are available for work and the workload of all of the resources is then calculated in step 210. This may be accomplished by calculating the amount of time remaining in the SLA period. This may be accomplished by subtracting the completion time set in the SLA and the current time.

An estimated task completion time for each resource is also calculated. This may be accomplished by multiplying a weighting factor by the LOE for each of the tasks already assigned to the resource for that SLA period and the new task. The results of all of the multiplications are added together for each resource to determine an estimated time to complete all of the tasks already assigned to each resource and the new task. The weighting factor may be the decimal equivalent of the performance history of the resource for each type of task. So long as at least one estimated completion time is within the SLA, the task may be assigned to the resource with the earliest completion time in step 211 so as to balance the workload of all of the resources.

For example, resource A already has tasks W and X assigned to them. Task W has an estimated LOE of 4 hours. Resource A completes, on average, W-type tasks in 90% of the estimated LOE for W-type tasks. As such, 0.9 is multiplied by 4 hours to come up with an estimated 3 hours 36 minutes for resource A to complete task W. Task X has a LOE of 1 hour and resource A completes, on average, X-type tasks in 110% of the estimated LOE. As such 1.1 is the weighting factor to be multiplied by 1 hour to come up with an estimated 1 hour and 6 minutes for resource A to complete task X. These two results are added together to get an estimated 4 hours and 42 minutes needed to complete the tasks W and X. Similarly, resource B has task Y with an estimated LOE of 45 minutes and a weighting factor of 1 and task Z with an estimated LOE of 1 hour and 15 minutes and a weighting factor of 1.2 assigned to them and is calculated as described above to need an estimated 2 hours and 15 minutes to complete both tasks Y and Z. If the task to be assigned is task L and the SLA for task L indicates that it must be completed by 5:00 pm and the current time is 12:00 pm then there is 5 hours left to complete any tasks already assigned to resources A and B and the new task L.

If the task to be assigned is task L and has an estimated LOE of 1 hour, and based on performance history both resources are estimated to actually complete the task in 1 hour, then for resource A, the estimated 1 hour for completing task L is added to the estimated 4 hours and 42 minutes needed to complete the tasks W and X to come up with an estimated 5 hours and 42 minutes to complete all of tasks L, W, and X. Since that would place the estimated completion time of 5:42 pm beyond the SLA for task L of 5:00 pm then task L would not be assigned to resource A. For resource B the estimated 1 hour for completing task L is added to the estimated 2 hours and 15 minutes to complete tasks Y and Z to come up with an estimated 3 hours and 15 minutes to complete all of tasks L, W, and X. Since that would place the estimated completion time of 3:15 pm within the SLA for task L of 5:00 pm then task L would be assigned to resource B.

However, if task L has an estimated LOE of 10 minutes and based on performance history both resources are estimated to be able to complete the task in 10 minutes, then for resource A, the estimated 10 minutes for completing task L is added to the estimated 4 hours and 42 minutes needed to complete the tasks W and X to come up with an estimated 4 hours and 52 minutes to complete all of tasks L, W, and X. Since that would place the estimated completion time of 4:52 pm within the SLA for task L of 5:00 pm then task L may be assigned to resource A. For resource B the estimated 10 minutes for completing task L is added to the estimated 2 hours and 15 minutes to complete tasks Y and Z to come up with an estimated 2 hours and 25 minutes to complete all of tasks L, W, and X. Since that would place the estimated completion time of 2:25 pm within the SLA for task L of 5:00 pm then task L may be assigned to resource B. Since resource B has the earlier completion time of 2:25 then task L would be assigned to resource B in order to help balance the workloads of resources A and B.

If the task L has an estimated LOE that would place the completion of any resource to be beyond the SLA of task L, then one or more of the tasks assigned to a resource may need to be rescheduled to be completed by another resource.

This may be accomplished by generating a list of tasks from resources A and B that have an estimated LOE which when subtracted from the estimated completion time is greater than the difference between the estimated completion time and the SLA for task L. For example, if the task L has an estimated LOE of 3 hours then for resource A, the estimated 3 hours for completing task L is added to the estimated 4 hours and 42 minutes needed to complete the tasks W and X to come up with an estimated 7 hours and 42 minutes to complete all of tasks L, W, and X. Since that would place the estimated completion time of 7:42 pm beyond the SLA for task L of 5:00 pm then task L may not be assigned to resource A. For resource B the estimated 3 hours for completing task L is added to the estimated 2 hours and 15 minutes to complete tasks Y and Z to come up with an estimated 5 hours and 15 minutes to complete all of tasks L, W, and X. Since that would place the estimated completion time of 5:15 pm beyond the SLA for task L of 5:00 pm then task L may not be assigned to resource B. Therefore since task L may not be assigned to either resource, then one of the tasks from either resource A or B may need to be rescheduled For task A the difference between the SLA for task L of 5:00 pm and the estimated completion time of tasks L, W, and X of 7:42 pm is 2 hours and 42 minutes. For task B the difference between the SLA for task L of 5:00 pm and the estimated completion time of tasks L, W, and X of 5:15 pm is 15 minutes. As such, for resource A since the estimated LOE for task W of 3 hours and 36 minutes is greater than the difference between the estimated completion time and the SLA for task L of 2 hours and 42 minutes, then task W is added to a list of possible tasks to be rescheduled. For resource B, since the estimated LOE for task Y of 45 minutes and the estimated LOE for task Z of 1 hour and 15 minutes is greater than the difference between the estimated completion time and the SLA for task L of 15 minutes, then tasks Y and Z are added to the list of possible tasks to be rescheduled. As such, the list of possible tasks to be rescheduled consists of tasks W, Y, and Z. The task with the lowest LOE would be selected for attempting to reschedule since it may be more likely to fit a shorter task in to another resource's schedule than a longer one. In the above example, task Y would be selected to be rescheduled to another resource.

The rescheduling of task Y may be accomplished through the same process as described above and treating task Y as a new task. It is noted that if task Y is unable to be rescheduled to another resource then it may be attempted to reschedule task Z. If none of the tasks can be rescheduled then two or more shorter tasks may need to be rescheduled.

Alternatively, if task Y is unable to be rescheduled to another resource then one or more of the tasks from the candidate resources for task Y may attempt to be rescheduled in the same manner as described above. As such, the process would ripple through the enterprise until all of the tasks are optimally assigned.

As an alternative to rescheduling a task to be completed by another resource, a task may be reprioritized to be completed in a different order so as to enable all of the tasks to be completed within their SLA period. For example, as described above if the SLA for task L is 5:00 pm and has an estimated LOE of 3 hours then currently neither of resources A or B may complete task L by the SLA period for task L of 5:00 pm. If task Y that was assigned to resource B has an SLA of 12:00 pm the following day then task L may be assigned to resource B with a higher priority of completion than task Y. As such, tasks Z and L may be completed by resource B first and then task Y may be completed so as to ensure all of the tasks are completed by their SLA period.

It is noted that the assignment of tasks may be refreshed as the resources change, for example at shift changes, etc. This may be accomplished by simply trading workloads with resources in the new shift or it may be accomplished through reassigning any uncompleted task to the resources in the new shift using the method described above.

Also, the above example was made assuming tasks would take less than one day to complete and each resource's workload was scheduled within one day. However, tasks may also take multiple days or weeks to complete and a resource's workload may be scheduled for an entire week, month, or more.

The above disclosure may be embodied in many other specific forms without departing from the spirit or scope of the disclosure. For example, another metric for determining which resource will be the most effective for completing a given task may be an error rate or reassignment rate for each type of task for every resource within an enterprise. Further, any other known method for optimizing or balancing workloads may be used without departing from the spirit or scope of the disclosure. Similarly any other known method for rescheduling tasks may be used without departing from the spirit or scope of the disclosure. Also, while the above disclosure is described through the use of a BPM system, any other known system for assigning tasks to resources, such as a call center, may use the system and methods described above.

As such, described above is a system and method having dynamic task assignment within an enterprise that considers various anticipatory factors at the time of assignment. These anticipatory factors may include one or a combination of all of a type of task, a task LOE, a task SLA, or a presence, location, schedule, workload, or performance history of a resource. This system and method advantageously enables high priority tasks to be completed in a timely manner while maintaining a balanced workload between all of the resources.

Figure 3:
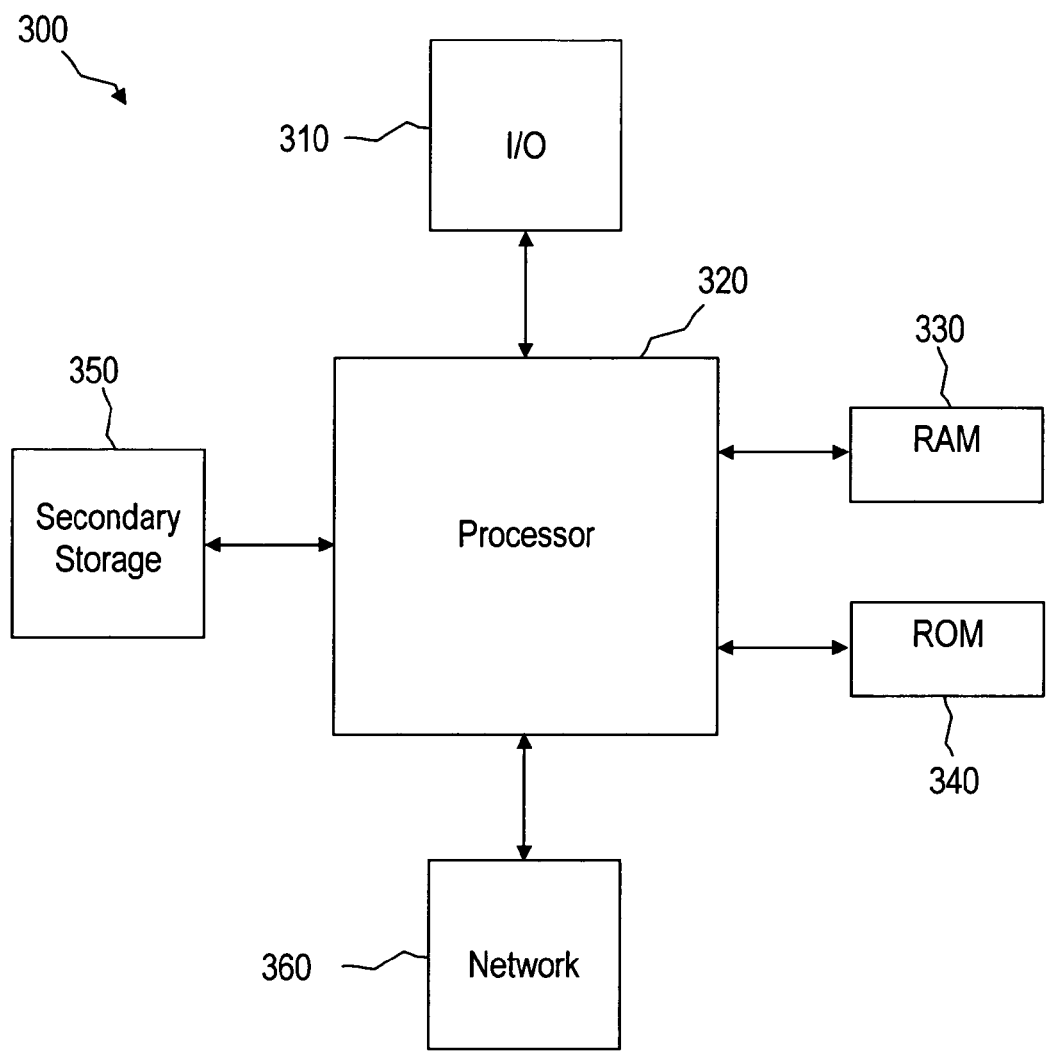
FIG. 3 is an illustrative example of a general-purpose computer.

The systems and methods described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 300 includes a processor 320 (which may be referred to as a central processor unit or CPU) that is in communication with memory devices including secondary storage 350, read only memory (ROM) 340, random access memory (RAM) 330, input/output (I/O) 310 devices, and network connectivity devices 360. The processor may be implemented as one or more CPU chips.

The secondary storage 350 is typically comprised of one or more disk drives or tape drives and is used for non-volatile storage of data and as an over-flow data storage device if RAM 330 is not large enough to hold all working data. Secondary storage 350 may be used to store programs which are loaded into RAM 330 when such programs are selected for execution. The ROM 340 is used to store instructions and perhaps data which are read during program execution. ROM 340 is a non-volatile memory device which typically has a small memory capacity relative to the larger memory capacity of secondary storage. The RAM 330 is used to store volatile data and perhaps to store instructions. Access to both ROM 340 and RAM 330 is typically faster than to secondary storage 350.

I/O 310 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 360 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 360 devices may enable the processor 320 to communicate with an Internet or one or more intranets. With such a network connection, it is contemplated that the processor 320 might receive information from the network, or might output information to the network in the course of performing the above-described method steps. Such information, which is often represented as a sequence of instructions to be executed using processor 320, may be received from and outputted to the network, for example, in the form of a computer data signal embodied in a carrier wave.

Such information, which may include data or instructions to be executed using processor 320 for example, may be received from and outputted to the network, for example, in the form of a computer data baseband signal or signal embodied in a carrier wave. The baseband signal or signal embodied in the carrier wave generated by the network connectivity 360 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 320 executes instructions, codes, computer programs, scripts which it accesses from hard disk, floppy disk, optical disk (these various disk based systems may all be considered secondary storage 350), ROM 340, RAM 330, or the network connectivity devices 360.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A method for the dynamic assignment of tasks to resources, comprising:
   determining, by a computer, a group of one or more candidate resources based on defined attributes of a task to be assigned, wherein the task attributes include a specified deadline for task completion;
   analyzing, by a computer, the task and the group of one or more candidate resources to assign the task to a resource based on factors comprising the resource's work schedule, performance history, workload, and the task's level of effort, wherein the resource's performance history represents an average amount of time previously required by the resource to complete the task's type of task, and wherein the task's level of effort represents an amount of effort one or more resources in an enterprise are expected to take to complete the task;
   processing the level of effort for the task to be assigned with one or more of the workload, performance history, and work schedule for each candidate resource in the group of one or more candidate resources to determine a task completion time for each candidate resource, wherein the processing comprises:
      multiplying, for each candidate resource in the group of one or more candidate resources, a weighting factor by a corresponding level of effort for each task previously assigned to a corresponding candidate resource and the task to be assigned; and
      determining, for each candidate resource in the group of one or more candidate resources, the task completion time by adding each result of the multiplying;
   rescheduling at least one task previously assigned to at least one of the one or more candidate resources to be completed by another resource when the processing estimates that the task completion time for each candidate resource is beyond the specified deadline for task completion; and
   notifying the resource of the task assignment.

2. The method of claim 1, wherein the group of one or more candidate resources is filtered based on one or more of a presence, qualification, and work schedule of each candidate resource in the group of one or more candidate resources.

3. The method of claim 1, wherein the processing determines which candidate resource has the earliest task completion time.

4. The method of claim 3, wherein the task is assigned to the resource based on the earliest task completion time.

5. The method of claim 2, wherein candidate resource presence is determined through detecting the candidate resource on an interface technology.

6. The method of claim 5, wherein the task is assigned to the resource through the interface technology.

7. The method of claim 1, further comprising dynamically refreshing the assignment and notification of tasks as changes occur with the resource.

8. The method of claim 1, wherein the amount of effort is determined by averaging an amount of time a plurality of resources in the enterprise take to complete the task's type of task.

9. The method of claim 1, wherein the weighting factor is a decimal equivalent of the performance history.

10. A system for dynamically assigning tasks to resources, comprising:
a business process management system that tracks a workload and performance history for each of a plurality of candidate resources; and
at least one resource computing device coupled to the business process management system to receive assigned tasks and to provide resource work schedule information,
wherein the business process management system is configured to:
compare a level of effort for completing a task to be assigned with one or more of the following: a work schedule, the workload, and the performance history of a candidate resource of the plurality of candidate resources, and
reprioritize one or more tasks already assigned to one of the candidate resources to be completed in a different order when the comparison determines that the task cannot be assigned to any candidate resource,
wherein the resource's performance history represents an average amount of time previously required by the resource to complete the task's type of task,
wherein the task's level of effort represents an amount of time one or more resources in an enterprise are expected to take to complete the task,
wherein the comparison comprises configuring the business process management system to determine, for each candidate resource of the plurality of candidate resources, a completion time for the one or more tasks already assigned to a corresponding candidate resource, and
wherein the determination of the completion time comprises configuring the business process management system to:
multiply, for each candidate resource of the plurality of candidate resources, a weighting factor by a corresponding level of effort for each task previously assigned to a corresponding candidate resource; and
determine, for each candidate resource, the task completion time by adding each result of the multiplying.

11. The system of claim 10, wherein the task has task attributes including a task type, and a service level agreement for indicating when the task is to be completed.

12. The system of claim 11, wherein the business process management system also assigns the task to the resource based on the service level agreement.

13. The system of claim 10, wherein if the comparison determines that the task cannot be assigned to any candidate resource then one or more tasks already assigned to one of the candidate resources are further reassigned.

14. The system of claim 11, wherein the comparison further comprises configuring the business process management system to:
add, for each candidate resource, the level of effort for completing the task to be assigned to the completion time for the one or more tasks already assigned to obtain an estimated completion time; and
compare the estimated completion time with the service level agreement indicating when the task is to be completed.

15. The system of claim 10, wherein the business process management system determines a presence of at least one of the candidate resources through interacting with an interface technology on the computing device.

16. The system of claim 15, wherein the business process management system communicates the assignment of the task to the resource through the interface technology.

17. The system of claim 10, wherein the business process management system determines the schedule of at least one of the candidate resources through interacting with a calendar technology on the computing device.

18. The system of claim 10, wherein the business process management system dynamically refreshes the assignment of tasks as changes occur with one or more resources.

* * * * *